(12) United States Patent
Schurter et al.

(10) Patent No.: US 10,779,480 B2
(45) Date of Patent: Sep. 22, 2020

(54) PLANT DORMANCY CONTROL SYSTEM

(71) Applicant: S&W INGENIERIA AGRICOLA Y PROPIEDAD INTELECTUAL SPA, Santa Cruz, VI Región (CL)

(72) Inventors: Anibal Schurter, Peralillo (CL); John Warmerdam, Hanford, CA (US)

(73) Assignee: S & W Ingeneira Agricola y Propiedad Intelectual SpA, Santa Cruz (CL)

( * ) Notice: Subject to any disclaimer, the term of this patent is extended or adjusted under 35 U.S.C. 154(b) by 450 days.

(21) Appl. No.: 15/489,032

(22) Filed: Apr. 17, 2017

(65) Prior Publication Data

US 2017/0215353 A1    Aug. 3, 2017

Related U.S. Application Data

(63) Continuation-in-part of application No. PCT/US2015/055100, filed on Oct. 12, 2015.

(60) Provisional application No. 62/064,423, filed on Oct. 15, 2014.

(51) Int. Cl.
*A01G 13/02* (2006.01)
*A01G 17/00* (2006.01)
*A01G 22/00* (2018.01)
*A01G 7/00* (2006.01)
*A01G 13/00* (2006.01)

(52) U.S. Cl.
CPC ............. *A01G 17/005* (2013.01); *A01G 7/00* (2013.01); *A01G 13/00* (2013.01); *A01G 13/0206* (2013.01); *A01G 17/00* (2013.01); *A01G 22/00* (2018.02); *Y02A 40/30* (2018.01)

(58) Field of Classification Search
CPC ............... A01G 13/0206; A01G 13/02; A01G 13/0212; A01G 13/0231; A01G 13/0237; A01G 13/04; A01G 13/043; A01G 2013/046
See application file for complete search history.

(56) References Cited

U.S. PATENT DOCUMENTS

| | | | | |
|---|---|---|---|---|
| 893,441 | A * | 7/1908 | Caruthers | A01G 13/043 47/29.6 |
| 1,106,624 | A † | 8/1914 | Cadwallader | |
| 1,916,868 | A * | 7/1933 | Starks | A01G 13/0231 403/207 |
| 2,015,471 | A * | 9/1935 | Genuit | A01G 13/0225 160/327 |
| 3,051,185 | A * | 8/1962 | Reynolds | A01G 13/043 135/115 |
| 3,537,688 | A * | 11/1970 | Stein | E04H 15/003 135/87 |

(Continued)

*Primary Examiner* — Trinh T Nguyen
(74) *Attorney, Agent, or Firm* — Ladas & Parry LLP

(57) ABSTRACT

A dormancy control system for use with plants such as fruit trees, nut trees, and perennial berry bushes planted in commercial settings. The dormancy control system employs vertical shade structures to control the dormancy of plants such as fruit trees, nut trees, and perennial berry bush crops. The dormancy control system results in dramatic increases in crop yield, and may be coupled with orchard planting directional orientation, evaporative cooling systems, and chemical and hormone based spray applications

14 Claims, 19 Drawing Sheets

(56) References Cited

U.S. PATENT DOCUMENTS

| | | | | |
|---|---|---|---|---|
| 5,179,798 | A | * | 1/1993 | Sonagere ............ A01G 13/0231 47/29.1 |
| 5,519,965 | A | † | 5/1996 | Robinson |
| 6,578,316 | B2 | * | 6/2003 | Temple .............. A01G 13/0231 47/29.5 |
| 6,796,083 | B2 | * | 9/2004 | Hadar .................... A01G 13/10 47/31 |
| 2004/0049976 | A1 | * | 3/2004 | Maffei ............... A01G 13/0231 47/20.1 |
| 2006/0272202 | A1 | * | 12/2006 | Gaudet, Sr. ........ A01G 13/0231 47/31 |
| 2012/0067388 | A1 | † | 3/2012 | Zummach |
| 2018/0310491 | A1 | * | 11/2018 | Cunial ............... A01G 13/0206 |

\* cited by examiner
† cited by third party

Serial No.: 15/489032
New Drawing

PLANT DORMANCY CONTROL SYSTEM

CROSS REFERENCE APPLICATIONS

This application is a continuation-in-part of International Application PCT/US2015/055100 filed 12 Oct. 2015, which claims the benefit of U.S. Provisional Patent Application No. 62/064,423 filed Oct. 15, 2014, the content of which is incorporated herein by reference.

TECHNICAL FIELD

The invention relates to a dormancy control system for use with plants such as fruit trees, nut trees, and berry bushes planted in commercial settings. More particularly, the invention pertains to the use of shade structures to control the dormancy of plants such as fruit trees, nut trees, and perennial berry bush crops, optionally coupled with orchard planting directional orientation, the use of evaporative cooling systems, and the use of various chemical and hormone based spray applications.

BACKGROUND OF THE INVENTION

Many plants, including stone and pone fruit trees, nut trees, and perennial berry bushes, develop next year's buds during the summer each year. In the autumn of each year, these new buds go through a multi-stage process resulting in a dormant state. The nature and quality of the dormancy of these buds has been understood to be primarily controlled by the temperature to which the buds are exposed. Each species (or in many cases each variety) of fruit tree, nut tree, and perennial berry bush has specific dormancy requirements, which are typically expressed as minimum chilling units. Each chill unit is roughly equivalent to 1 hour of bud exposure to the required chilling temperature, or a lower temperature, for that variety. There are several different accepted methods for calculating chill units, and depending on the plant species or varieties involved some of these methods take into account the greater or lesser chilling effect of specific temperatures by assigning higher or lower chill units to each hour spent within specific temperature ranges. Depending on the amount of chilling units required by each variety of plant for a healthy dormancy, various plant varieties are referred to as "high chill" varieties (meaning that they require a large number of chilling units) or "low chill" varieties (meaning that they require a small number of chilling units.)

If plant buds do not annually receive the minimum required chilling units or dormancy periods, or if plant buds do not otherwise annually undergo a healthy dormancy period for that species or variety, then a number of problems arise. These problems include delayed or inadequate foliation and flowering, or delayed fruit production, or fruit production in non-commercial quantities or quality.

It has also been important to match the dormancy requirements of a particular variety with the location where that variety is planted. Even though a planting location may have ideal growing conditions during the main growing season for a particular variety, that same planting location may not naturally have the required dormancy conditions for that variety. A mismatch of dormancy requirements and planting location can cause serious problems. For example, planting a low chill variety in a cold area may result in trees flowering too early and being damaged by late frosts. As another example, planting a high chill variety in a warm area may result in little or no fruit production or low quality fruit production.

Cherries, in particular, present a good example of the effects of a mismatch between dormancy requirements and planting locations. Cherries grow very well in warm areas during their main growing season. But, even with low-chill cherry varieties, it is difficult and sometimes impossible in those warm areas to obtain the minimum required chill units or to have a healthy dormancy period.

In early efforts to help control dormancy, commercial fruit growers tried to use overhead nets or shading, stretched horizontally on cables above the orchard, to protect their orchards from direct solar radiation during the autumn and winter months. This approach did not work, however, because the net/shade structures trapped heat/energy and infrared light beneath the net/shade structure and actually caused the average plant bud temperature to increase during the autumn and winter—the opposite effect of what the growers were trying to achieve. These horizontal overhead net/shade structures actually exacerbated the dormancy problem the growers were trying to solve, increasing the heat over the plants during daytime and nighttime due to the known greenhouse effect. Under this scenario is impossible or at least difficult to control the dormancy of the plants.

Currently, some growers of fruit trees, nut trees, and perennial berries use evaporative cooling systems (including overhead water sprinklers as one example) in their orchards and fields to help keep plant bud temperatures at or below the required minimum chill temperature for the required number of hours (chill units or dormancy period). These growers also use several chemical or hormone based sprays to help induce, maintain, break, or otherwise affect plant bud dormancy. Some growers use both evaporative cooling and chemical/hormone sprays in their efforts to improve the quality and duration of plant bud dormancy in these warm areas. Despite all of these efforts, and despite use of low-chill plant varieties, there are still many years where commercial fruit growers do not get a commercial crop in warm growing areas, due to a failure of the plant buds to move into a healthy dormant state for the minimum required period of time. If the global climate continues to warm, the insufficient dormancy issue may be an increasing problem for cherry growers as well as other stone fruit and pome fruit growers.

There are also situations where a grower wants to either induce early dormancy to produce an earlier crop, wants to extend dormancy to produce a later crop, or wants to create a dormancy period for an everbearing plant species or variety in an everbearing commercial planting location in order to concentrate or control the timing of harvest. In all three situations growers have attempted to use evaporative cooling coupled with chemical/hormone sprays.

Cherries present a good example of the need to produce early or late crops. Producing early or late crops of cherries, for example, can be highly profitable for growers.

No-chill ever-bearing blueberry plants present a good example of the need to concentrate and control the time of harvest for ever-bearing plant varieties arises with commercial blueberry fields planted at low latitudes in either the northern or southern hemispheres. While everbearing blueberry plants are very productive on an annual basis, when planted in everbearing locations, only a small number of blueberries on each plant are ever ripe at any one time. This greatly increases the labor costs, because pickers may need to pass through and harvest those fields ten or more times during the year. Inducing a dormancy period in those no-chill ever-bearing blueberry plants would help to concentrate the entire annual production of blueberries into a much shorter and better defined harvest period, reducing the number of passes by pickers through the field while still maintaining a high annual yield.

Besides, it is known that the seasons are due to the tilt of the earth axis and the earth's position regarding the sun during its arbitration. The tilted axis of the earth and its arbitration result in varying the angle of the incident sunrays through the year, wherein said incident angle reaches its minimum during the northern and southern solstices for locations in the south hemisphere and north hemisphere, respectively. The natural variation of the incident sunrays during a year provokes variations in the duration of days and nights, which is detected by the plants, being used for the natural dormancy periods. In addition, this natural variation of the sunrays incident angle also depends on the earth's latitudes, wherein for high latitudes the variation of the incident angle is higher than for low latitudes, which has a smaller variation.

In addition, plants are very sensitive to the duration of the days and nights, which also varies due to the incident angle of the sunrays. The sensitivity of the plants to the duration of days and nights allows predicting the seasons and to coordinate flowering, maturation, recessing intervals, etc. For instance, some plants need longer or shorter nights for controlling its physiological processes, rendering complex the implementation of different plant varieties in different latitudes.

Accordingly, there is a need for a system of controlling and improving dormancy conditions for fruit trees, nut trees, and perennial berry plants, to allow these crops to be commercially grown in areas that otherwise do not naturally have optimal, or even adequate, dormancy conditions, and to control the date or duration of harvest.

The following is a disclosure of the present invention that will be understood by reference to the following detailed description taken in conjunction with the accompanying drawings.

DETAILED DESCRIPTION OF SPECIFIC EMBODIMENTS

Figure 1:
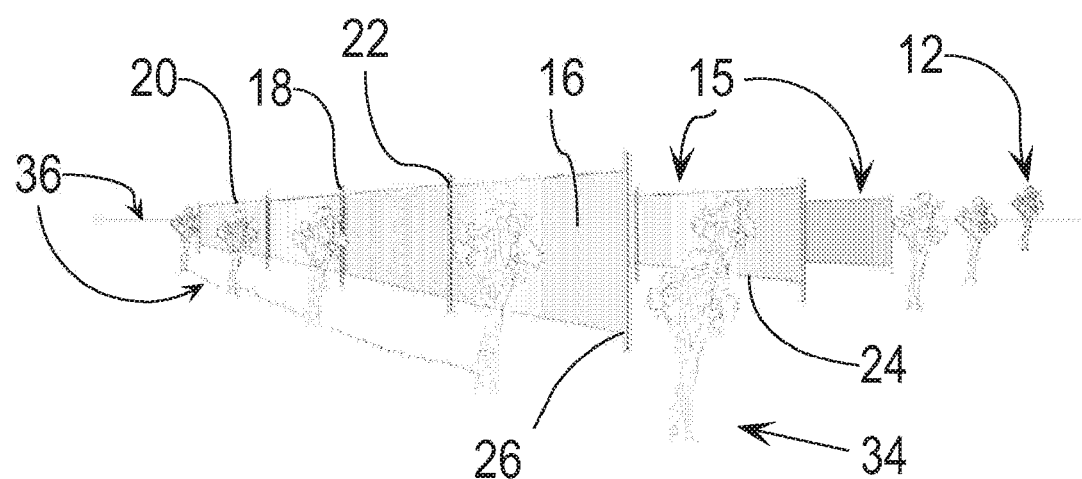
FIG. 1 is a perspective view of the plant dormancy control system, with the shade fabric deployed, according to an embodiment of the invention.

The invention relates to a plant dormancy control system, employing shade structures 15 that could be installed over the orchard, in-line with plant rows 34 oriented in an East-West direction (E-W), or that are installed transversely across plant rows 34 oriented in a North-South direction (N-S). FIGS. 1 through 7 show the plant dormancy control system 10, according to certain preferred embodiments of the present invention. According to the other embodiment of the invention, the plant dormancy control system could be also installed in-line with plant rows 34 oriented in an N-S direction or transversely across plant rows 34 oriented in a E-W direction, shortening the daylight hours sensed by the plants.

In one preferred embodiment, the plant dormancy control system of the present invention is for use in a commercial planting 11 of cherry trees, which may be referred to herein simply as the "orchard". The commercial planting 11 includes a multiple of plants 12 that produce fruit 14. For the purposes of the foregoing disclosure, the plants 12 can be referred to simply as "cherry trees", the fruit 14 can be referred to simply as "cherries", and the commercial planting of cherry trees can be referred to as a "cherry orchard".

In another preferred embodiment, the plant dormancy control system of the present invention is for use in a commercial planting 11 of blueberries, which may be referred to herein simply as the "blueberry field". The commercial planting 11 includes a multiple of plants 12 that produce fruit 14. For the purposes of the foregoing disclosure, the plants 12 can be referred to simply as "blueberry bushes", the fruit 14 can be referred to simply as "blueberries", and the commercial planting of blueberry bushes can be referred to as a "blueberry field".

All of the preferred embodiments for plant dormancy control system 10 that are disclosed herein can be used alternatively with any variety of fruit tree, nut tree, or perennial berry bushes that requires dormancy or short days, or that will tolerate extended or induced dormancy. All varieties of stone fruit varieties, pome fruit varieties, nut varieties, and many perennial berry varieties require dormancy periods and each have their own specific minimum chilling requirements. Additionally, there are no-chill ever-bearing varieties of plants that will nevertheless tolerate an induced dormant or semi-dormant period of time for the purpose of concentrating the harvest time period for those varieties.

Figure 3:
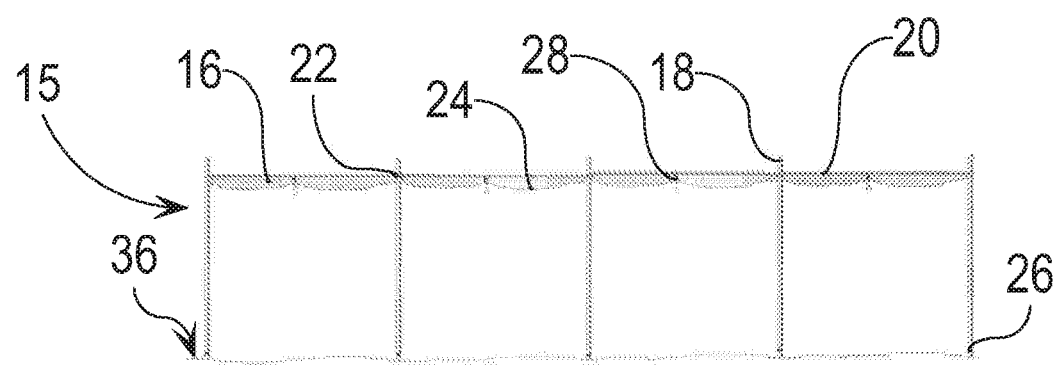
FIG. 3 is side view of the plant dormancy control system, with the shade fabric retracted, according to an embodiment of the invention.
Figure 4:
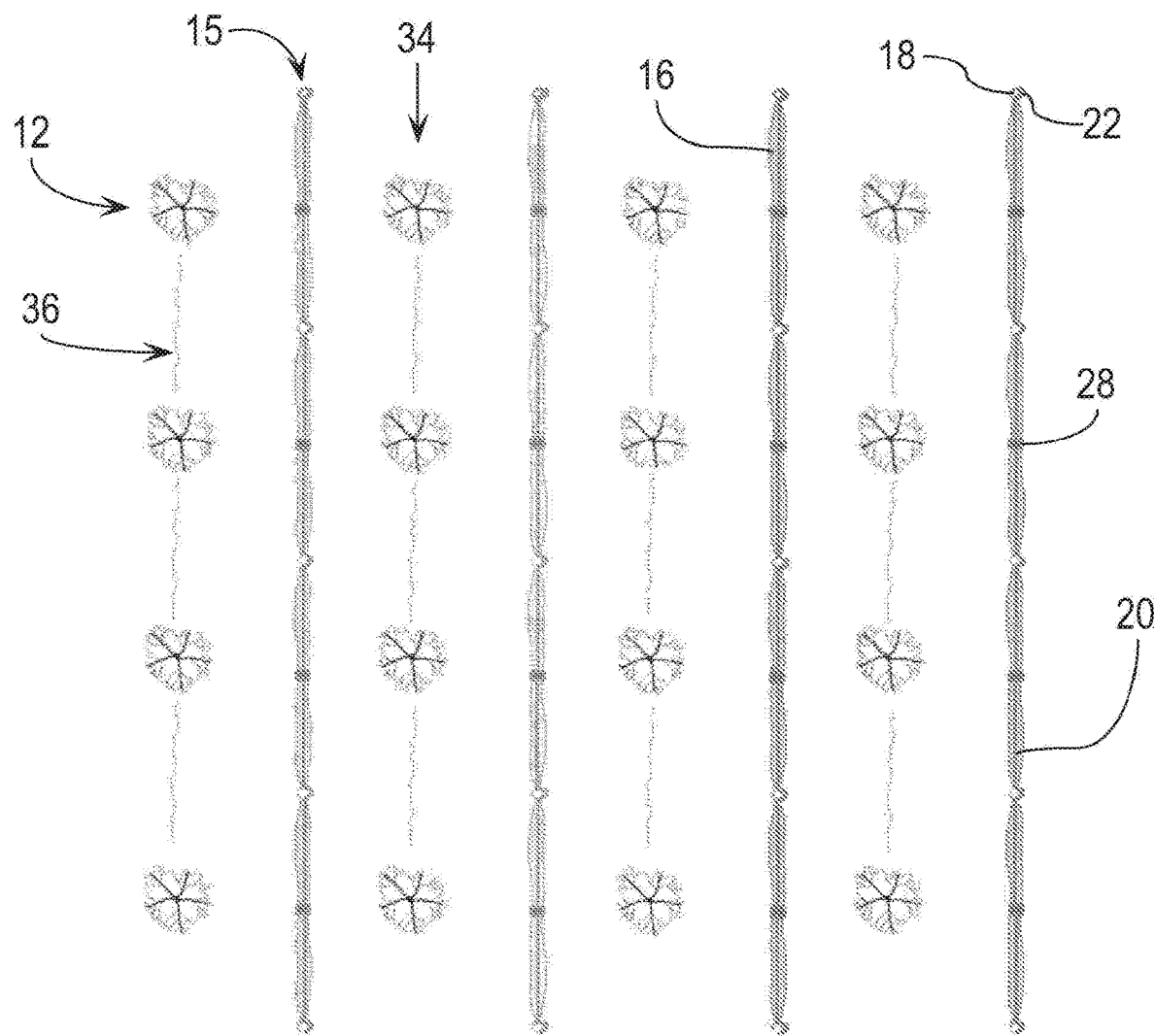
FIG. 4 is an overhead view of the plant dormancy control system, with the shade structures directionally oriented in-line with E-W plant rows and the shade fabric retracted, according to an embodiment of the invention.
Figure 5:
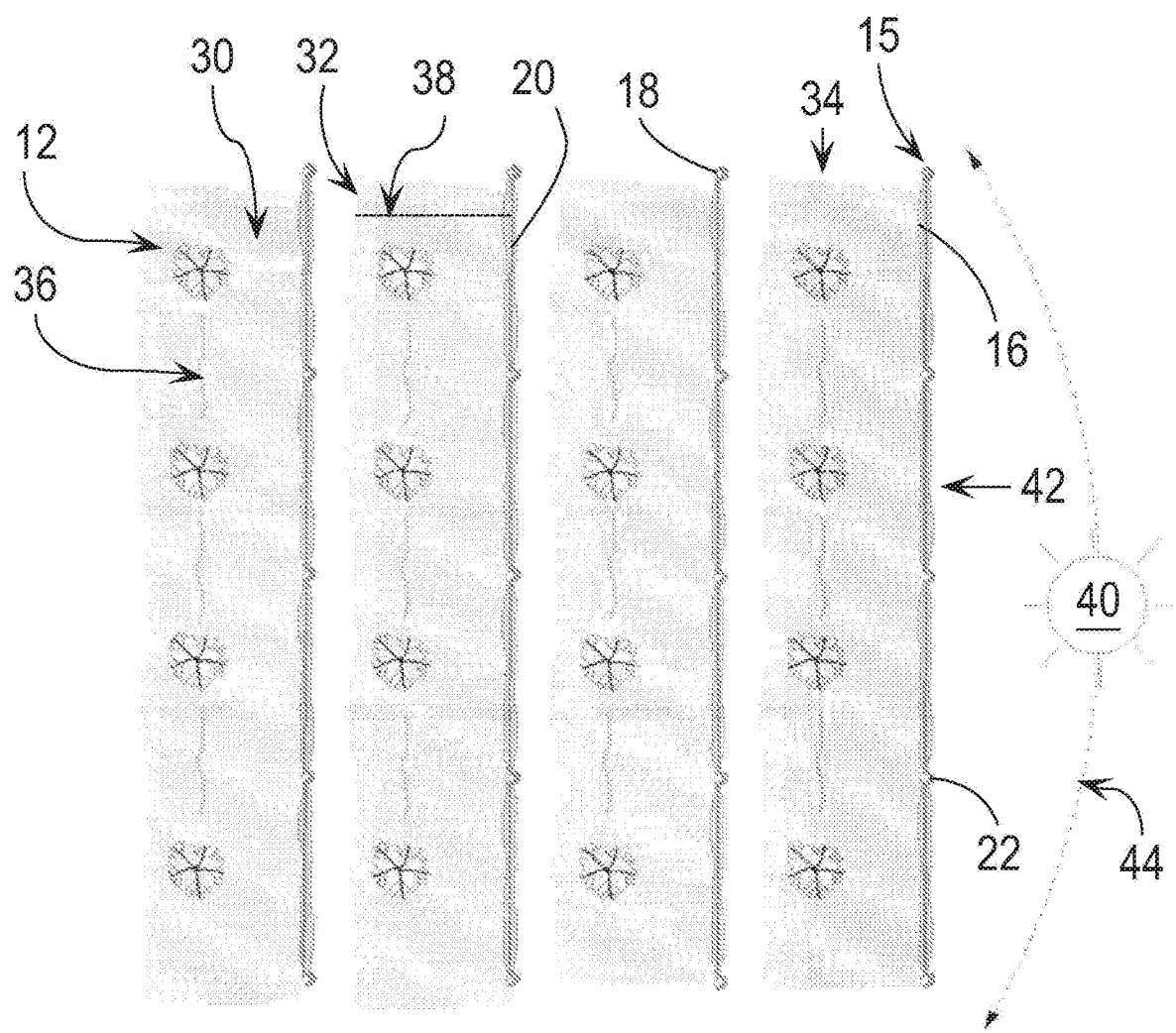
FIG. 5 is an overhead view of the plant dormancy control system, with the shade structures directionally oriented in-line with E-W plant rows and the shade fabric deployed, according to an embodiment of the invention.
Figure 6:
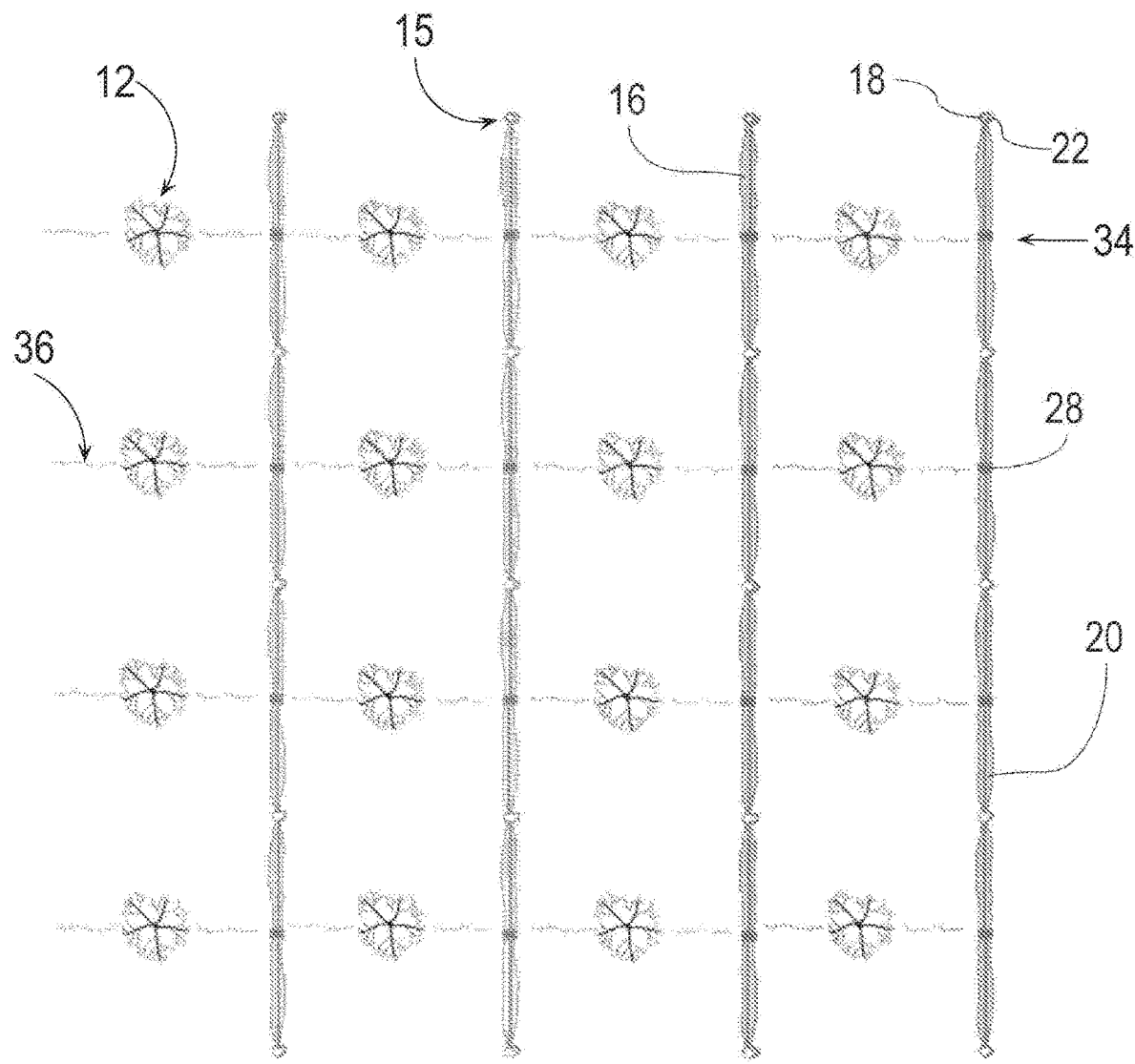
FIG. 6 is an overhead view of the plant dormancy control system, with the shade structures directionally oriented transversely across N-S plant rows and the shade fabric retracted, according to an embodiment of the invention.
Figure 7:
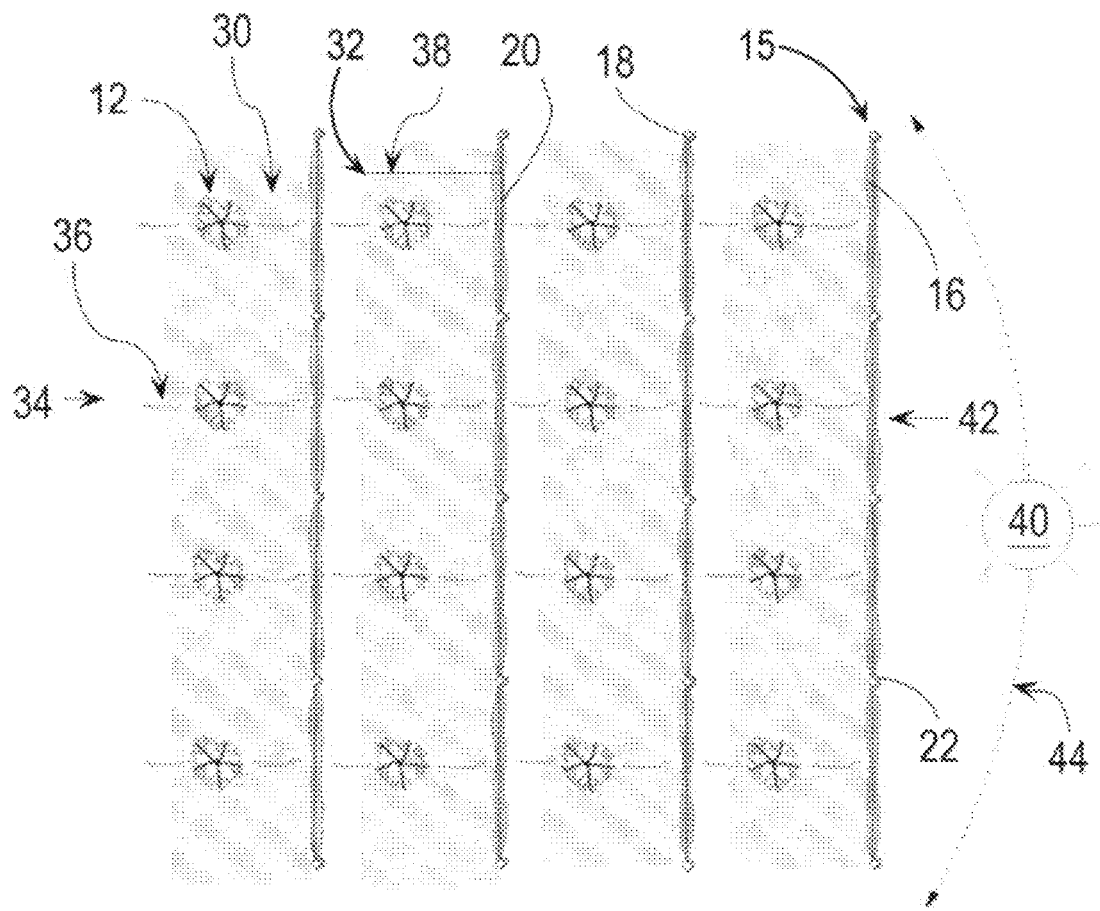
FIG. 7 is an overhead view of the plant dormancy control system with the shade structures directionally oriented transversely across N-S plant rows and the shade fabric deployed, according to an embodiment of the invention..

The plant dormancy control system 10 of the present invention includes a shade structure 15 which includes vertical supports 18 in the form of wood, metal, plastic, or concrete poles that support shade fabric 16, which can be deployed (shown in FIGS. 1, 5, and 7) or retracted (shown in FIGS. 2, 3, 4, and 6), with the shade structure 15 oriented in-line with plant rows 34 that run approximately in an East-West direction (E-W), as shown in FIGS. 4 and 5, or a shade structure 15 oriented transversely across plant rows 34 that run approximately in a North-South direction (N-S), as shown in FIGS. 6 and 7. According to one embodiment of the invention the shade fabric 16 can be vertically deployed/retracted, being retracted towards the top of the shade structure 15, as shown in FIGS. 2, 3, 4 and 6. Nevertheless, it is also possible to vertically retract the shade fabric 16 towards the base of the shade structure 15 or provide an arrangement of shade structure 15 for laterally deploying/retracting the shade fabric 16, being retracted towards the left and/or right. Therefore, the shade fabric 16 can be vertically or laterally deployed/retracted, in any direction.

Figure 2:
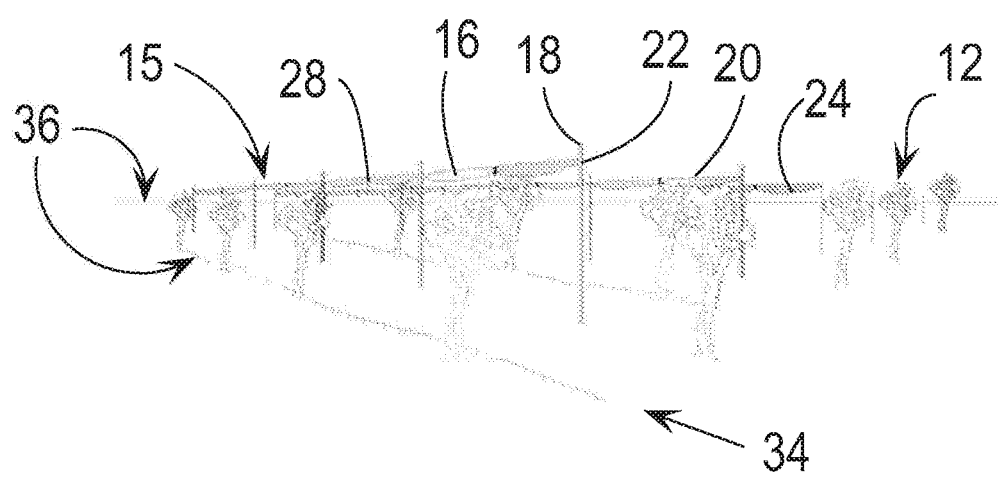
FIG. 2 is a perspective view of the plant dormancy control system, with the shade fabric retracted, according to an embodiment of the invention.

A most preferred plant dormancy control system 10 consists of substantially vertical shade structures 15 that are installed in a commercial planting 11 directionally oriented in-line with plant rows 34, and includes vertical supports 18 and a shade fabric 16 that is attached to an upper support cable 20 and a lower support cable 24, with upper support cable 20 attached to each vertical support 18 by upper support cable attachment 22, and lower support cable 24 attached to each vertical support 18 by lower support cable attachment 26, as shown in the perspective views of FIGS. 1 and 2, the side view of FIG. 3. When shade fabric 16 is deployed, the shade structure 15 produces shade during daylight hours by blocking direct solar radiation 42 produced by the sun 40 from reaching plants 12, as shown in FIGS. 1, 5, 7. The substantially vertical installation of the shade structure should be considered as an erected structure contemplated to provide shade as defined below, not limited to a specific erecting angle. In a preferred embodiment, the erecting angle of the shade is of 45 degrees or more and in a more preferred embodiment the erecting angle is of 90° C..

Figure 8:
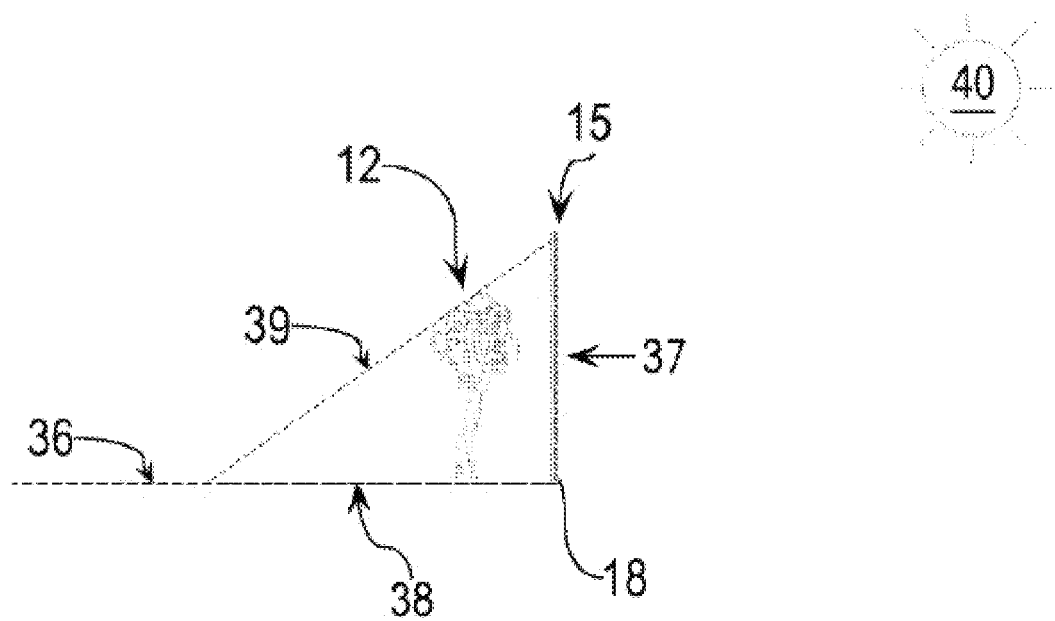
FIG. 8 is a cross-section view of the plant dormancy control system, with the shading structures and the shading material arranged to project the shadow over the plants.

Taking into consideration the latitude, orientation, and slope of the commercial planting 11 as a whole, shade structures 15 are preferably placed to create a shaded area 30 during daylight hours, or at least during part of the day, in the form of a triangular prism that substantially encompasses plants 12 in each plant row 34, and Which. substantially blocks direct solar radiation 42 from reaching plants 12, as shown in FIGs 1, 5, and 7. In particular, the shaded area 30 encompases the plants 12 even when the sun is at maximum height, protecting the plant :from the incident solar sunrays, In some embodiments, it would be required to block the solar radiation for reaching not only the plant but also the ground nearby the same, yh said embodiments the height of thea shade fabric should be adjusted (increased) for providing a bigger shaded area. The triangular prism of shaded area 30 consists of a triangular shaded area with three legs (ground leg 38, vertical leg 37, and shade leg 39) as shown in FIG. 8 created by shade structures 15 and that extends the full length of plant row 34. The ground leg 38 extends from the base of the vertical support 18 to shade edge 32, The vertical leg 37 extends from the base of the shade structure 15, or base of the vertical support 18, to top of the shade structure 15, or top of shade fabric 16 where it is attached to upper support cable 20. The shade leg 39 extends from the top of the shade structure 15, or top of the shade fabric 16 where it is attached to upper support cable 20 down to shade edge 32, Depending on the time of day and the distance and angle of two consecutive shade structures 15, the ground lag 37 may be divided in two legs, one over the ground and the other over the consecutive shade structure forming the shade edge 32 over the shade structure.

The shade structure 15 takes advantage of the incident sunrays angle variation due to the earth tilt and movement, providing a shaded area 30 that allows controlling dormancy periods in comparison to plants directly exposed to the sunrays during the whole year, even in low latitude locations.

Besides, the shade structure 15 also allows controlling the duration of night or days as sensed by the plants, controlling the physiological processes related to the natural behavior of the plant during the year, being possible to provide short days (or long nights) due to the interception of infrared wavelength spectra by the shade fabric 16.

As shown in FIGS. 1 through 7, the substantially vertical shade structure 15 for the plant dormancy control system 10 also includes a shade fabric 16 that extends substantially vertically approximately four to seven meters from the ground surface 36 for plants 12 that are fruit or nut trees, or that extends vertically approximately one to five meters from the ground surface 36 for plants 12 that are berry bushes like blueberries. The height of the shade fabric depend mainly on the height of the plant to be cover and the angle of the sun, wherein at higher sun angles higher the shade fabric should be for projecting a longer shade (longer ground leg). Besides, in cases of high sun angles it may be required to reduce the separation between each shade structure 15, maximizing the coverage of the shaded area 30. The number of shade structures required for each orchard depends on the required coverage of the shaded area. The shade fabric 16 is held in a substantially vertical position by upper support cable 20 and a lower support cable 24, as shown in FIGS. 1, 2, and 3, and held up by substantially vertical shade structure 15, and stretches along each plant row 34 (or transversely across all plant rows 34) of commercial planting 11. In a preferred embodiment, as shown in FIGS. 1, 5 and 7, the shade fabric 16 serves to block much of or substantially all of the direct solar radiation 42 from the orchard, reflecting only a small portion or substantially none of the direct solar radiation 42 from the orchard. Most preferably, the shade fabric serves to block approximately 65% or more of the direct solar radiation from the orchard, preferably 80% or more, more preferably 90% or more, while reflecting approximately 20% or less of the direct solar radiation from the orchard, preferably 15% or less, more preferably 10% or less. In this regard, even when with the current technologies and materials it is not possible, the attempt of the invention is to block 100% of the direct solar radiation from 300 nm to 900 nm. For the preferred embodiments, the substantially low reflectivity of shade fabric is necessary in order to substantially avoid reflecting part of the blocked direct solar radiation back onto the plants 12 that are located on the sun 40 side of each shade structure 15. Therefore, the low or substantially nonreflective surface of the shade fabric 16 reduces light diffusion, which avoids contributing in the diffuse radiation that is naturally provoked by clouds and humidity. Preferably, the shade fabric material is of a dark color, achieving high absorption rates and having a low reflective behavior. More preferably, the shade fabric 16 is made of a dark polymer material, of high absorption and low reflectivity, more preferably of a black polymer material.

Figure 9:
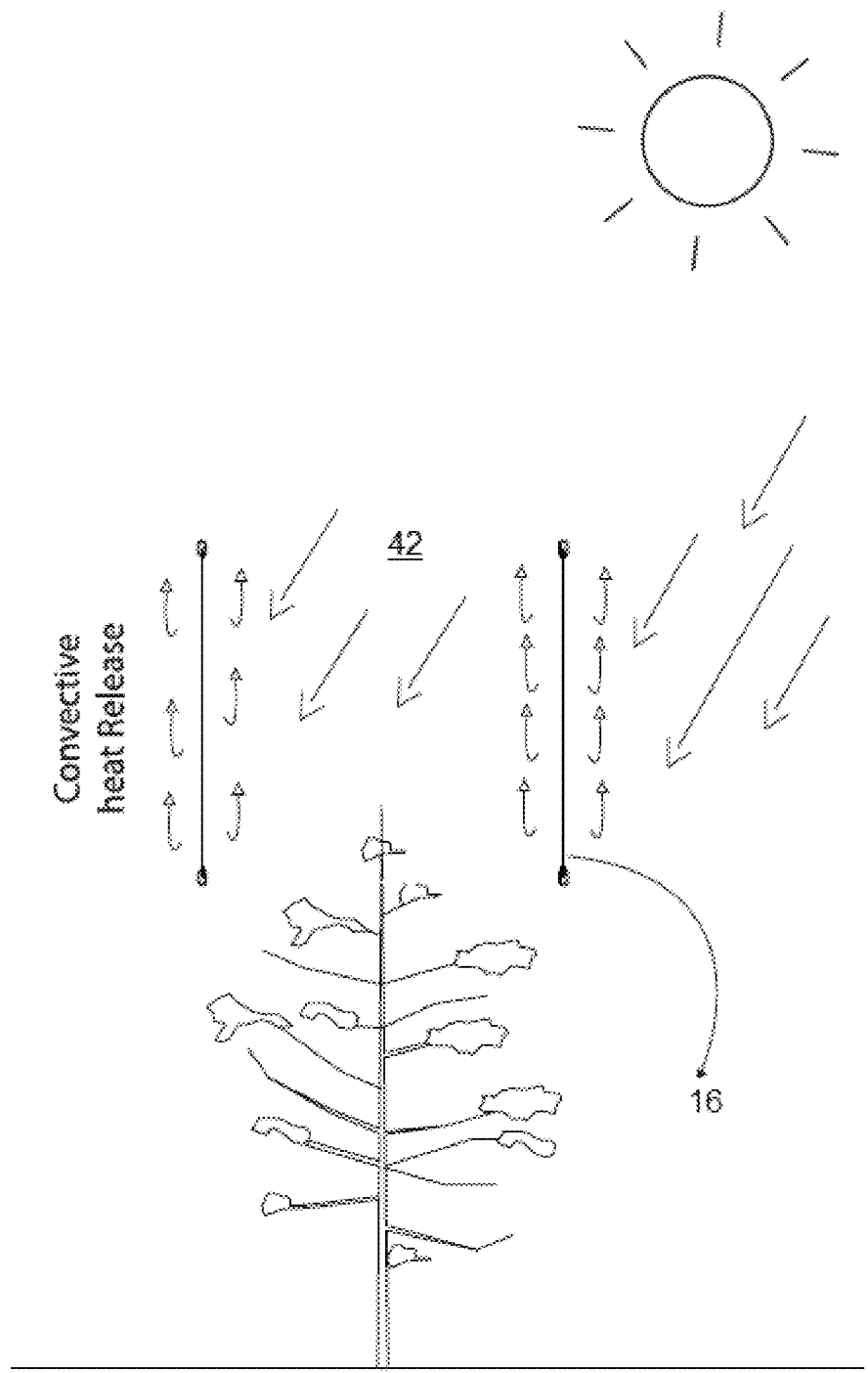
FIG. 9 is a diagram of the air masses convective heat release, according to one embodiment of the invention.
Figure 16:
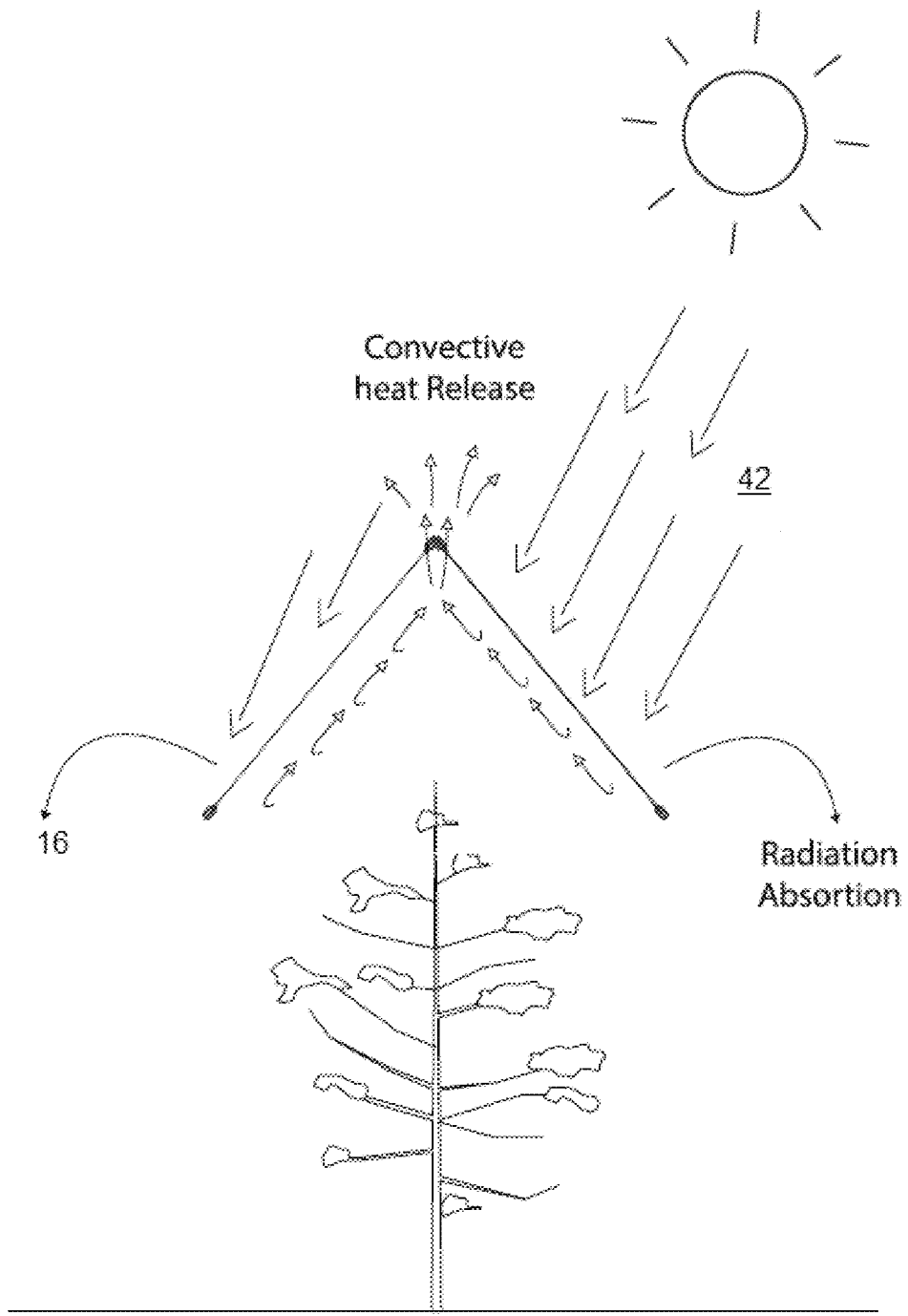
FIG. 16 is diagram of the air masses convective heat release, according to an alternative embodiment of the invention.

Because the shade fabric 16 is substantially nonreflective and has a large surface area, it disperses most of the absorbed heat generated from direct solar radiation 42 during the day, for instance due to convection of the air masses as shown in FIGS. 9 and 16 and then at night rapidly radiates any residual heat vertically up out of the commercial Planting 11 to the sky due to the direct exposure of the plants to the sky. This effect is known as radiative cooling, in which the heat retained by the bodies during the daytime is released to the free sky during night time For taking advantage of this effect it is required to directly expose the bodies to the sky avoiding any overhead cover between the bodies and the sky for facilitating the cooling of the plants.

Considering the above, the plant dormancy control system 10 acts as a positive cooling system, cooling the plants due to the continuous release of hat absorbed by the orchard, due to the received radiation converted in different wavelengths, and due to the absorbtion of heat by the shade fabric, which are subsequently released by convection effect due to the movement of air masses, especially at day, or by radiation during nighttime as indicated above, especially at night, mainly with a wavelength within the infrared range as shown in FIGS. 9 and 16

Besides, the shade structure 15 takes advantages of the movement of cold and warm air masses. The shade structure 15 reduces the effect of the wind in the close vicinity of the plants, facilitating the natural convection process and cooling the plants due to the air inversion, in which colder air masses are displaced near the ground, cooling the plants, and the warmer air masses are displaced vertically up due to its lower weight. This effect facilitates radiative cooling during the night, in which slowing down the wind in the vicinity of the plants improves the efficiency of heat radiative release vertically to the sky at night. On the other hand, during the day the wind can be used for improving the heat convection process with wind forced convection, which would help to release the heat from the hot surface of the shade structure 15. In this regard, an embodiment of the shade structure can include openings for improving the wind circulation during day, facilitating forced convection process, which can be closed for reducing the wind velocity at night, facilitating natural convection and radiative cooling process.

Then, the plant dormancy control system 10 is suitable to induce dormancy periods in plants located at different latitudes, controlling the heat and radiation exposure for increasing the harvest yield of the orchard. This approach is of relevance particularly due to the global warming.

The most preferred embodiment of the plant dormancy control system 10 also includes the ability to retract shade fabric 16 to stop creating shade for dormancy control, as shown in FIGS. 2, 3, 4, and 6. Preferably, in order to retract shade fabric 16 the lower support cable attachments 26 on vertical supports 18 are opened or removed, and lower support cable 24 is used to lift shade fabric 16 to approximately the same height as upper support cable 20. Then, upper support cable 20, shade fabric 16, and lower support cable 24 are all temporarily bound together with shade fabric gathering tie 28 during the time that shade fabric 16 is retracted. An adaptation of or other shade fabric support arrangement can be used to vertically or laterally deploying/retracting the shade fabric 16, in any direction.

Figure 10:
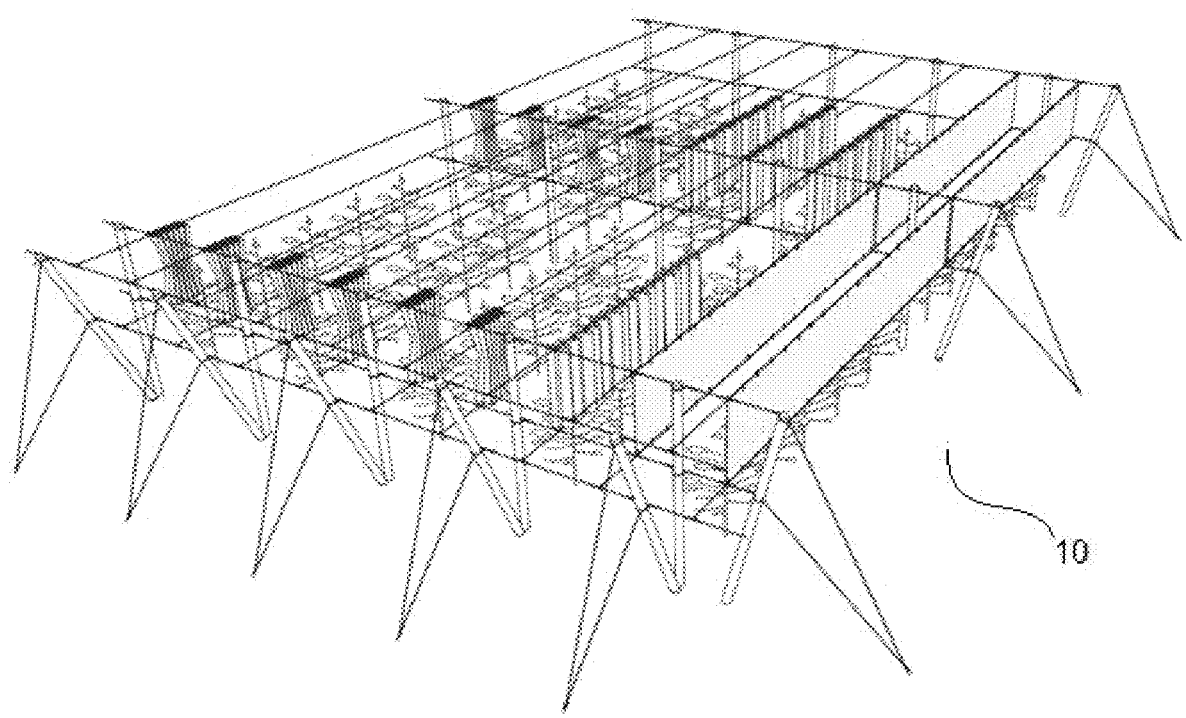
FIGS. 10 to 12 are perspective, side and front views, respectively, of the plant dormancy control system with the shading material according to an embodiment of the invention, arranged parallel to the plant rows.
Figure 11:
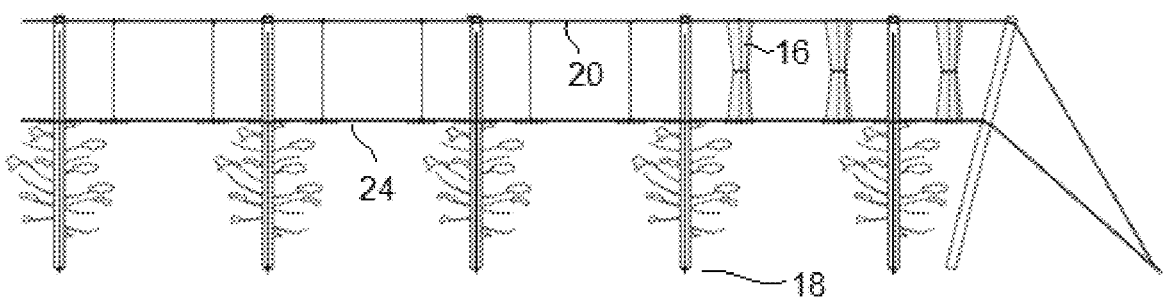
Figure 12:
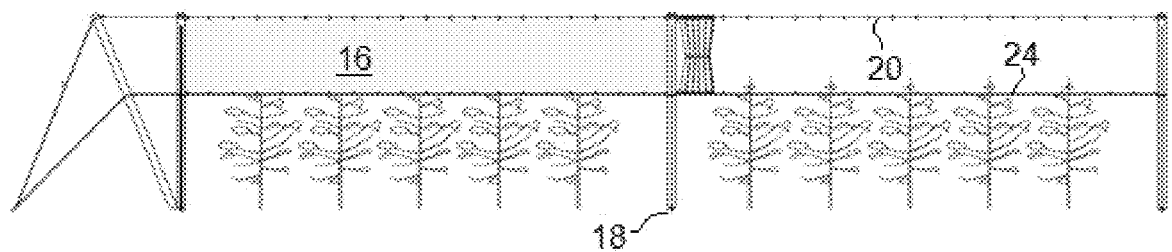
Figure 13:
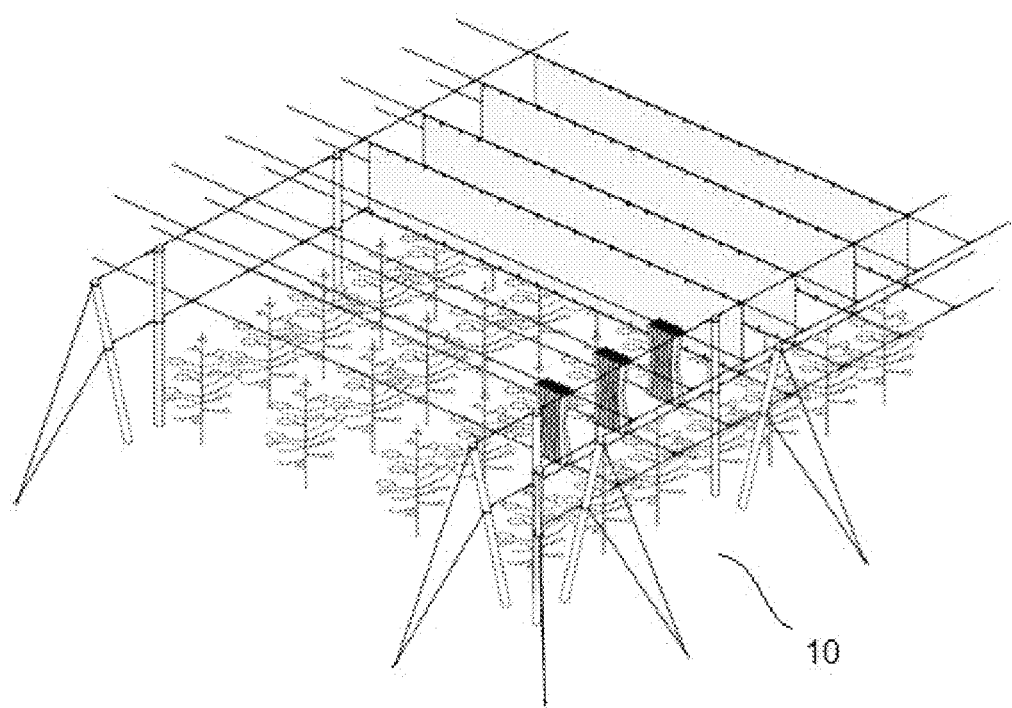
FIGS. 13 to 15 are perspective, side and front views, respectively, of the plant dormancy control system with the shading material according to an embodiment of the invention, arranged transversely to the plant rows.
Figure 14:
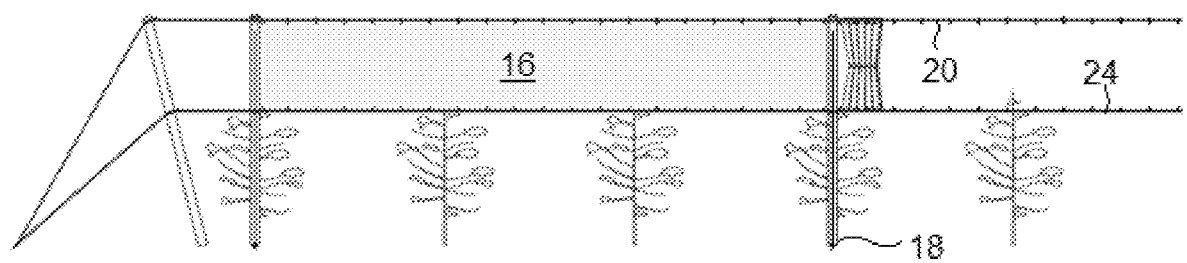
Figure 15:
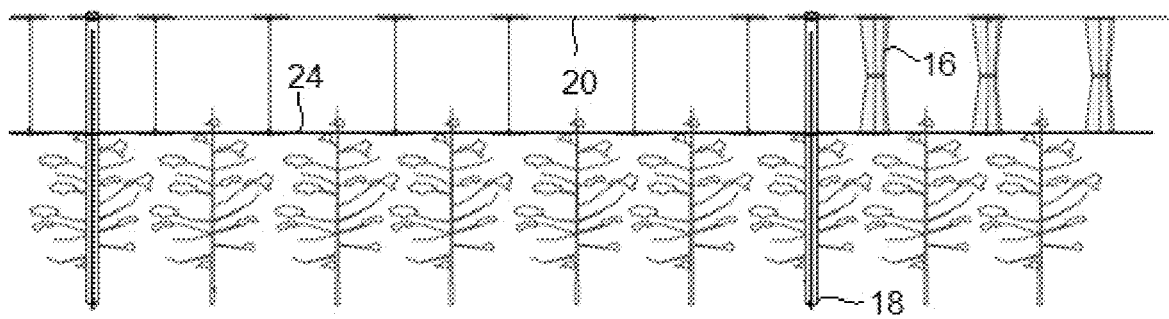
Figure 17:
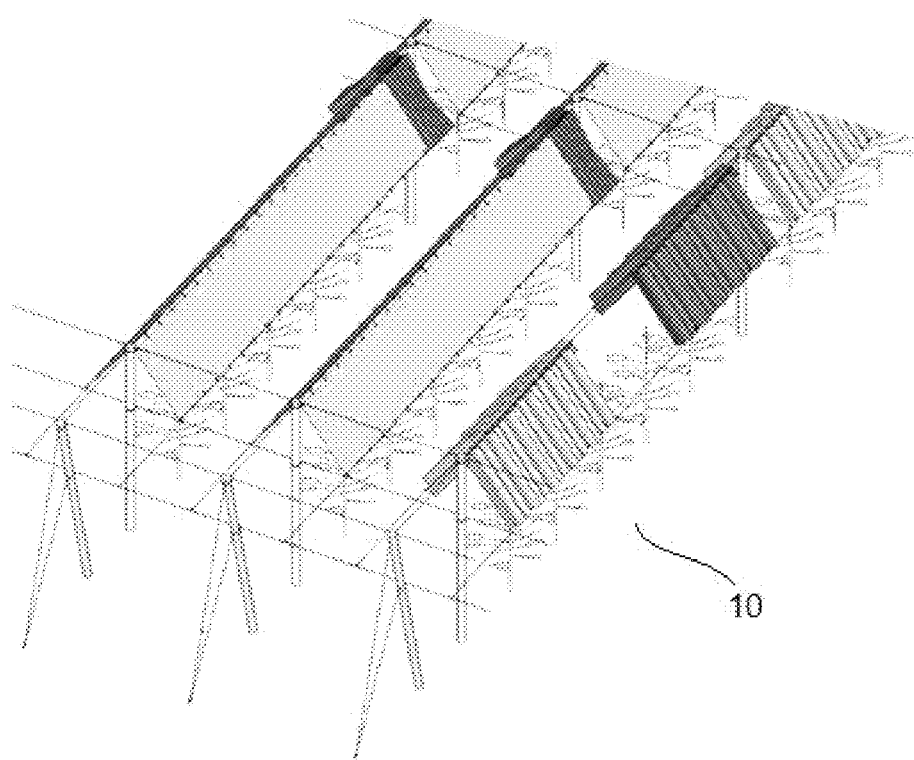
FIGS. 17 to 19 are perspective, side and front views, respectively, of the plant dormancy control system with the shading material according to an alternative embodiment of the invention, arranged parallel to the plant rows.
Figure 18:
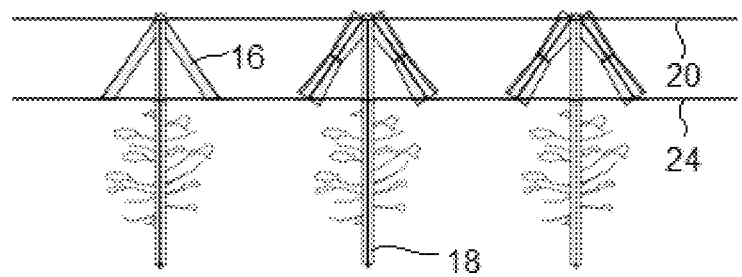
Figure 19:
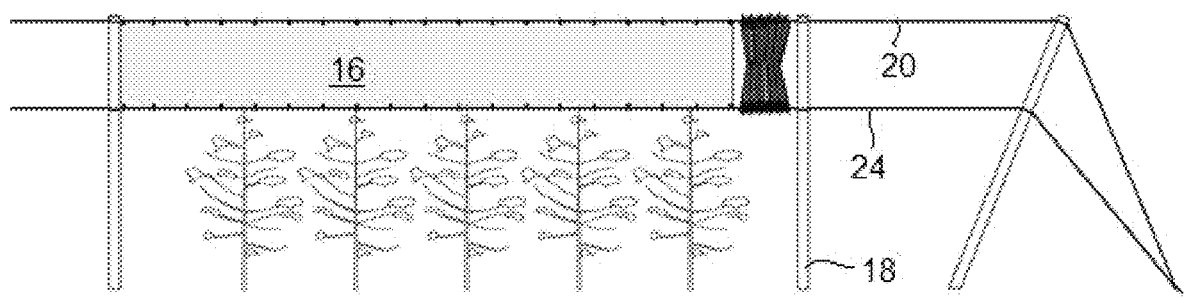
Figure 20:
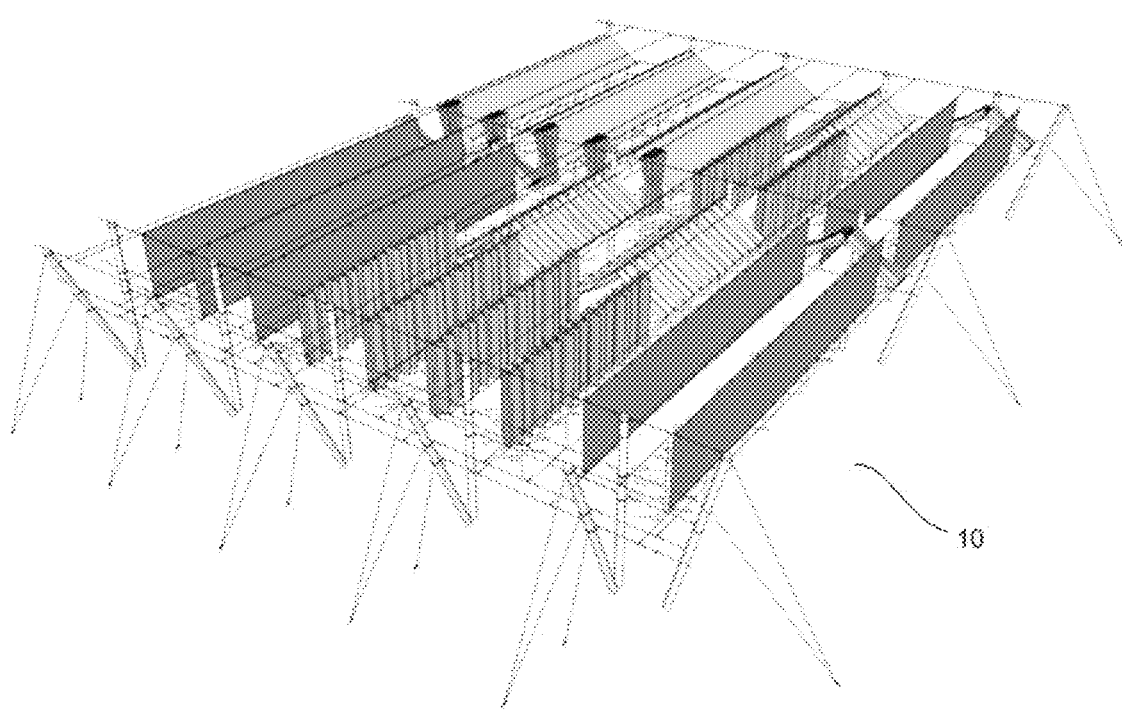
FIG. 20 is a perspective view of the plant dormancy control system with the shading material according to a combination of two embodiments of the invention.

FIGS. 10 to 12 show an embodiment of the invention according to FIG. 4, wherein the plant dormancy control system is arranged parallel to the planting rows. FIGS. 13 to 15 show an embodiment of the invention according to FIG. 6, in which the plant dormancy control system is arranged transversally to the planning rows. FIGS. 17 to 18 show an alternative embodiment of the invention, wherein the plant dormancy control system is arranged in an angled manner and, optionally, in combination with top covers. Finally, FIG. 20 shows an embodiment of the invention in which the plant dormancy control system is arranged combining the preferred embodiment of FIGS. 10 to 12 with the embodiment of FIGS. 17 to 19.

Example 1

The plant dormancy control system 10 has been installed in cherry orchards to test the degree of plant dormancy control that can be achieved. In a test installation, the use of shade structures 15 was evaluated in terms of controlling cherry bud temperatures during the cherry tree dormancy period, with a maximum ambient temperature of 25° C. during the dormancy period, on typical sunny days. This data was collected between the hours of 10 am to 4 pm. The results of that experiment are set forth in Table 1 below

TABLE 1

| Control Bud Temperature | Shade Bud Temperature | Shade + Evaporative Cooling Bud Temperature |
| --- | --- | --- |
| 25.4° C. | 16.9° C. | 15.2° C. |
| 26.4° C. | 19.4° C. | 15.3° C. |
| 30.1° C. | 22.5° C. | 21.5° C. |
| 32.0° C. | 25.2° C. | 21.2° C. |
| 29.8° C. | 22.5° C. | 18.0° C. |
| 31.3° C. | 23.9° C. | 22.2° C. |
| 31.6° C. | 24.3° C. | 22.8° C. |

Example 2

Further experiments were performed using control trees, shade structures 15 ("SE" in Table 2 below), evaporative cooling ("EC" in Table 2 below), and various chemical/hormone sprays like Dormex®, Thiadiazuron (TDZ) and Erger®. The results of those experiments are set forth in Table 2 below:

TABLE 2

| Treatment | Total Production | Harvest Timing |
| --- | --- | --- |
| No Dormex ® | 0-5 cherries per tree | May 8 |
| Early Dormex ® | 0-5 cherries per tree | |
| Late Dormex ® | 5-50 cherries per tree | |
| Thiadiazuron (TDZ) | 0-50 cherries per tree | |
| Erger ® | 0-50 cherries per tree | |
| EC + Early Dormex ® | 3-5 ton/ha | |
| SE + Early Dormex ® | 15-20 ton/ha | April 28 |
| SE + EC + Early Dormex ® | 15-20 ton/ha | April 20 |
| EC + TDZ | 3-5 ton/ha | |
| SE + TDZ | 25-30 ton/ha | |
| SE + EC + TDZ | 25-30 ton/ha | April 28 |
| EC + Erger ® | 4 ton/ha | |
| SE + Erger ® | 15 ton/ha | |
| SE + EC + Erger ® | 20 ton/ha | |

The experimental results set forth in Table 2 demonstrate the relative ineffectiveness of the traditional dormancy control systems using chemical/hormone sprays, or sprays coupled with evaporative cooling. Using the traditional dormancy control systems, the best result was approximately 5 metric tons of cherries per hectare.

The experimental results set forth in Table 2 also demonstrate the surprising effectiveness of incorporating the use of shade structures 15 with either evaporative cooling, or chemical/hormone sprays, or both. The addition of shade structures 15 resulted in a cherry crop yield of between 15 and 30 metric tons per hectare—an improvement of at least 300% to 600% in crop yield. These results were entirely unexpected.

Example 3

Further experiments were performed using two different cherry varieties ("Santina" and "Bing") at different locations (Aculeo, Región Metropolitana, Chile and Rancagua, Región del Libertador Bernardo O'Higgins, Chile) during the year 2015. The tests were made including the shade structures 15 ("SE" in Tables 3 and 4 below), Dormex® at different percentages, Break® at a concentration of 20 cc/100 L, Agricultural Oil at different percentages and/or CPPD® at a concentration of 15 ppm, wherein said products are traditionally used for controlling crops. The results of those experiments are set forth in Table 3 below for the yield and in Table 4 below for the harvest distribution per date:

TABLE 3

| Cherry variety | Treatment* | Yield (Kg) |
|---|---|---|
| Santina (Aculeo) | Dormex 3% + Break 20 cc/100 L | 1.895 |
| | SE + Dormex 3% + Break 20 cc/100 L | 12.075 |
| | Dormex 4% + Break 20 cc/100 L | 5.170 |
| | SE + Dormex 4% + Break 20 cc/100 L | 11.080 |
| Bing (Aculeo) | Dormex 3% + Break 20 cc/100 L | 1.464 |
| | SE + Dormex 3% + Break 20 cc/100 L | 3.380 |
| | Dormex 1.5% + Oil 1.5% | 3.168 |
| | SE + Dormex 1.5% + Oil 1.5% | 4.600 |
| Bing (Rancagua) | Dormex 3% + Break 20 cc/100 L | 5.110 |
| | SE + Dormex 3% + Break 20 cc/100 L | 10.130 |

TABLE 4

| Cherry variety | Treatment | Harvest % 11 Nov | Harvest % 20 Nov | Harvest % 26 Nov |
|---|---|---|---|---|
| Santina (Aculeo) | SE + Dormex 3% + Break 20 cc/100 L | 33.56 | 66.44 | — |
| | SE + Dormex 3% + CPPU 15 ppm + Break 20 cc/100 | 37.81 | 62.19 | — |
| | SE + Dormex 4% + Break 20 cc/100 | 53.09 | 47.91 | — |
| | Dormex 3% + Break 20 cc/100 L | — | 52.44 | 47.56 |
| | Dormex 3% + CPPU 15 ppm + break 20 cc/100 | — | 44.95 | 55.05 |
| | Dormex 4% + Break 20 cc/100 | — | 39.92 | 60.08 |

| Cherry variety | Treatment | Harvest % 3 Dic | Harvest % 9 Dic | |
|---|---|---|---|---|
| Bing (Rancagua) | SE + Dormex 1.5% + Oil 1% | 63.47 | 36.53 | — |
| | SE + Dormex 1.5% + CPPU 15 ppm + Break 20 cc/100 L | 61.13 | 38.87 | — |
| | SE + Dormex 3% + Break 20 cc/100 L | 60.05 | 39.95 | — |
| | Dormex 1.5% + Oil 1% | — | 100 | — |
| | Dormex 1.5% + CPPU 15 ppm + Break 20 cc/100 L | — | 100 | — |
| | Dormex 3% + Break 20 cc/100 L | — | 100 | — |

The experimental results set forth in Table 3 demonstrate the relative ineffectiveness of the traditional dormancy control systems using Dormex®, or other treatments, when compared with the same treatments but implementing the shade structure of the invention. Using the traditional dormancy control systems, the best result was yield of up to 5.170 Kg, whereas for the same treatment but including the shade structure the result was a yield of 11.080 Kg.

The experimental results set forth in Table 4 also demonstrate the surprising effectiveness of incorporating the use of shade structures 15 in anticipating the harvest of the cherry varieties. In both cases ("Santina" and "Bing") the harvest started earlier in the crops implementing the shade structures than in the crops with traditional treatments. In fact, in some cases the crops with the shade structure completed over the 50% of the harvest from 6 to 9 days earlier than the initiation of the harvest for the crops only with traditional dormancy systems.

It was found that by blocking the solar radiation from 600 nm to 750 nm in wavelength, preferably from 380 nm to 850 nm, the plant dormancy control system 10 prevented that range of radiation from striking the plant and activating the phytochromes of the plant, and apparently a high chill accumulation was induced resulting in a huge crop increase, even in the absence of temperature regimes that are commonly thought to be the only regulator of chill accumulation. It is observed that the incidental reduction in temperature on the buds of the plants had only a small secondary effect on increasing the level of dormancy.

In a preferred embodiment of the plant dormancy control system 10, substantially vertical shade structures 15 can be installed in commercial plantings 11 of plants 12 to provide adequate dormancy in locations where there are not sufficient natural chilling units available. In this preferred embodiment, the plant dormancy control system is used to solve the problem presented by planting a low chill variety in a warm or sunny location that does not naturally have adequate chilling units.

In an alternative preferred embodiment of the plant dormancy control system 10, substantially vertical shade structures 15 can be installed in commercial plantings 11 of plants 12 that are low chill plants to induce early dormancy in a warm location before the natural climatic conditions would have naturally induced a dormant condition in the plants. Because of the low minimum chilling units required by low chill fruit varieties, inducing early dormancy of those plants in a warm location using the plant dormancy control system would result in fruits being available for harvest much earlier than the same variety of low chill fruits grown in the same location under natural conditions. In this preferred embodiment, the dormancy requirements for those plants would be met much earlier than under natural conditions without the use of the plant dormancy control system 10. In this preferred embodiment, the plant dormancy control system is used to advance the harvest date of the fruit, while still achieving adequate dormancy and thus maintaining commercial quantities and quality for the harvested fruits.

In another alternative preferred embodiment of the plant dormancy control system 10, substantially vertical shade structures 15 can be installed in commercial plantings 11 of plants 12 that are high chill cherry plants to extend dormancy in a cold location for longer than the natural climatic conditions would have naturally have maintained dormancy. Because high chill fruit varieties can tolerate higher numbers of chilling units, it is possible to extend dormancy of those plants in a cold location using the plant dormancy control system in order to avoid the dangers of spring frost and to create fruit harvest dates much later than for the same variety of high chill fruits grown in the same location under natural conditions. In this preferred embodiment, the dormancy requirements for those plants would be extended much longer than under natural conditions without the use of the plant dormancy control system 10. In this preferred embodiment, the plant dormancy control system is used to delay both the bloom date and harvest date of plants, thus protecting the plants from the dangers of spring frost and still maintaining commercial quantities and quality for the harvested fruits.

In another alternative preferred embodiment of the plant dormancy control system 10, substantially vertical shade structures 15 can be installed in commercial plantings 11 of plants 12 that are no-chill ever-bearing plants to induce dormancy in a warm location for the purpose of concentrating the harvest of fruits into a harvest time frame that is only a few months long, instead of the normal continuous harvest that continues throughout the entire year under natural conditions. While no-chill ever-bearing fruit varieties do not have any minimum chill requirements, it is possible to use the plant dormancy control system 10 to put those no-chill ever-bearing fruit varieties into a dormant or semi-dormant state for a period of time, even when natural conditions would not induce a dormant or semi-dormant state. After a sufficient period of time in a dormant or semi-dormant condition, the shade fabric 16 is retracted, and the plants are allowed to bloom. Because there has been an induced state of dormancy or semi-dormancy, these no-chill ever-bearing fruit varieties bloom heavily and produce a large number of fruits over a period of several months. The no-chill ever-bearing fruit varieties subjected to an induced dormant or semi-dormant state thus have their harvest window concentrated into a relatively short period of time, and that period of time can start whenever desired by the grower depending on when the plant dormancy control system 10 is deployed in the commercial planting 11.

All of the preferred embodiments for plant dormancy control system 10 that are disclosed herein can be used alternatively with any variety of fruit tree, nut tree, or perennial berry bushes that requires dormancy, or that will tolerate extended or induced dormancy. As noted above, all varieties of stone fruit varieties, pome fruit varieties, nut varieties, and many perennial berry varieties require dormancy periods and each have their own specific minimum chilling requirements. Additionally, there are no-chill ever-bearing varieties of plants that will nevertheless tolerate an induced dormant or semi-dormant period of time for the purpose of concentrating the harvest time period for those varieties.

The term "substantially", "approximately", and "approximate" are employed herein throughout, including this detailed description and the attached claims, with the understanding that these terms denote a level of exactness as typical for the skill and precision in the generally applicable field of technology.

In compliance with the statutes, the invention has been described in language more or less specific as to structural features and method steps. While this invention is susceptible to embodiments in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

LIST OF REFERENCES

10 Plant dormancy control system
11 Commercial planting/Orchard
12 Plants
14 Fruits
15 Shade structure
16 Shade fabric
18 Vertical supports
20 Upper support cable
22 Upper support cable attachment
24 Lower support cable
26 Lower support cable attachment
28 Fabric gathering tie
30 Shaded area
32 Shade edge
34 Plant rows
36 Ground surface
37 Vertical leg
38 Ground leg
39 Shade leg
40 Sun
42 Direct solar radiation

The invention claimed is:

1. A plant dormancy control system of a commercial orchard or orchard including multiple plants arranged in plant rows, comprising:

shade structures arranged to block direct solar radiation produced by the sun from reaching plants during daylight hours or at least part of the day, wherein each shade structure comprises a non-refective shade fabric attached to the shade structure, said shade fabric arranged for creating a shaded area that substantially encompasses plants and which substantially blocks direct solar radiation from reaching plants during daylight hours or at least part of the day; and wherein the shade fabric is dark or a black polymer and absorbs 80% or more of the direct solar radiation from 550 nm to 850 nm in wavelength, while reflecting approximately 20% or less of that direct solar radiation preventing that range of radiation from striking the plants during daylight hours or at least part of the day, inducing dormancy periods in the plants .

2. The plant dormancy control system according to claim 1, wherein said shade fabric, has a large surface area and keeps most of the plants directly exposed to sky at nighttime, dispersing most of the absorbed heat generated from direct solar radiation during the day, and rapidly radiating any residual heat vertically up out of the commercial orchard to the sky during the night.

3. The plant dormancy control system according to claim 1, wherein the shade fabric and the shade structure are installed substantially vertical, between 45 to 90° C. in relation to the around.

4. The plant dormancy control system according to claim 1, wherein the shade structure further comprises:
vertical supports.

5. The plant dormancy control system according to claim 1, wherein the shade fabric can be deployed, retracted or detached of each shade structure, wherein the deployment and retraction of the shade fabric 16 can be vertically or laterally, as a curtain, in any direction.

6. The plant dormancy control system according to claim 4, wherein each shade structure further includes:
an upper support cable; and
a lower support cable;
wherein the upper support cable is attached to each vertical support by upper support cable attachment, and the lower support cable is attached to each vertical support by a lower support cable attachment.

7. The plant dormancy control system according to claim 6, wherein the shade fabric is held in a substantially vertical position by the upper support cable, the lower support cable and by the vertical supports.

8. The plant dormancy control system according to claim 7,
wherein the lower support cable attachments in the vertical supports are openable or removable in order to retract the shade fabric, and the lower support cable is used to lift shade fabric to approximately the same height as upper support cable.

9. The plant dormancy control system according to claim 8, wherein upper support cable, shade fabric, and lower support cable are all temporarily bound together with a shade fabric gathering tie during the time that shade fabric is retracted.

10. The plant dormancy control system according to claim 1, wherein the shade fabric extends substantially vertical approximately between 1 to 7 meters from the ground surface, depending on the height of the plants and sun angle.

11. The plant dormancy control system according to claim 1, wherein the shade fabric absorbs the direct solar radiation from 600 mn to 750 mn in wavelength, preventing that range of radiation from striking the plants.

12. The plant dormancy control system according to claim 1, wherein the shade structures are mounted in the commercial orchard is oriented in-line with plant rows that run approximately in an East-West direction (E-W), transversely across plant rows that run approximately in a North-South direction (N-S), in-line with plant rows that run approximately in an N-S direction, transversely across plant rows that run approximately in a E-W direction.

13. The plant dormancy control system according to claim 1, wherein the shaded area created by the each shade structure, particularly by the shade fabric consists of a triangular shaded area with three legs, ground leg, vertical leg, and shade leg, wherein the ground leg extends from the base of the shade structure to the edge of the shade, the vertical leg extends from the base of the shade structure to the top of the shade structure and the shade leg extends from the top of the shade structure down to the shade edge.

14. The plant dormancy control system according to claim 13 created by the each shade structure, particularly by, wherein the triangular shaded area covers the plants during most daylight hours, leaving the plant directly exposed to the sky, at least during the night.

* * * * *

UNITED STATES PATENT AND TRADEMARK OFFICE
CERTIFICATE OF CORRECTION

PATENT NO. : 10,779,480 B2
APPLICATION NO. : 15/489032
DATED : September 22, 2020
INVENTOR(S) : Anibal Schurter and John Warmerdam Page 1 of 1

It is certified that error appears in the above-identified patent and that said Letters Patent is hereby corrected as shown below:

In the Claims

Column 13, Line 6, Please correct Claim 3 as follows:
--The plant dormancy control system according to claim 1, wherein the shade fabric and the shade structure are installed substantially vertical, between 45 to 90° C. in relation to the ground.--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*